US009490867B2

(12) United States Patent
Voglewede et al.

(10) Patent No.: US 9,490,867 B2
(45) Date of Patent: Nov. 8, 2016

(54) CDMA COMMUNICATIONS DEVICE AND RELATED METHODS

(75) Inventors: Paul Edward Voglewede, N. Chili, NY (US); James Thomas Stoops, Walworth, NY (US)

(73) Assignee: HARRIS CORPORATION, Melbourne, FL (US)

( * ) Notice: Subject to any disclaimer, the term of this patent is extended or adjusted under 35 U.S.C. 154(b) by 1192 days.

(21) Appl. No.: 13/210,702

(22) Filed: Aug. 16, 2011

(65) Prior Publication Data

US 2013/0044744 A1 Feb. 21, 2013

(51) Int. Cl.
*H04B 1/7077* (2011.01)

(52) U.S. Cl.
CPC .................... *H04B 1/7077* (2013.01)

(58) Field of Classification Search
CPC .......... H04B 1/71052; H04B 1/7077
USPC .......................... 370/342; 375/147
See application file for complete search history.

(56) References Cited

U.S. PATENT DOCUMENTS

| | | | | |
|---|---|---|---|---|
| 4,203,164 A * | 5/1980 | Isaak et al. | | 367/134 |
| 5,305,347 A | 4/1994 | Roschmann et al. | | 375/1 |
| 5,642,377 A * | 6/1997 | Chung et al. | | 375/145 |
| 5,872,776 A | 2/1999 | Yang | | 370/342 |
| 5,905,721 A | 5/1999 | Liu et al. | | 370/342 |
| 5,982,763 A | 11/1999 | Sato | | 370/342 |
| 6,226,336 B1 | 5/2001 | Atarius et al. | | 375/364 |
| 6,385,185 B1 | 5/2002 | Huang | | 370/342 |
| 6,466,566 B1 | 10/2002 | De Gaudenzi et al. | | 370/342 |
| 6,996,158 B2 | 2/2006 | Bradley | | 375/148 |
| 6,996,162 B1 | 2/2006 | Hosur et al. | | 375/150 |
| 7,636,384 B2 | 12/2009 | Wang et al. | | 375/152 |
| 2002/0175857 A1 | 11/2002 | Abraham | | |
| 2003/0112854 A1 | 6/2003 | Shi et al. | | |
| 2008/0317182 A1* | 12/2008 | Zhang et al. | | 375/355 |
| 2009/0034727 A1* | 2/2009 | Chester et al. | | 380/263 |
| 2011/0151800 A1* | 6/2011 | Al-Qaq et al. | | 455/67.13 |

FOREIGN PATENT DOCUMENTS

| | | |
|---|---|---|
| EP | 1128564 | 8/2001 |
| WO | 0225829 | 3/2002 |

OTHER PUBLICATIONS

Borran et al "*Channel Estimation and Signal Detection for Multi-Carrier CDMA Systems with Pulse-Shaping Filter*" Nokia Mobile Phones, 6000 Connection Drive, 2:200, Irving TX 75039.

* cited by examiner

*Primary Examiner* — Robert M Morlan
*Assistant Examiner* — Mandish Randhawa
(74) *Attorney, Agent, or Firm* — Allen, Dyer, Doppelt, Milbrath & Gilchrist, P.A.

(57) ABSTRACT

A code division multiple access (CDMA) communications device includes a CDMA receiver to isolate a CDMA signal, and a processor to generate a quantized sample representation of the CDMA signal. The processor performs a hard correlation between the quantized sample representation of the CDMA signal and a quantized representation of a reference to generate a coarse time alignment. Based upon the coarse time alignment, the processor performs a soft correlation between actual values of the CDMA signal and the reference.

26 Claims, 7 Drawing Sheets

FIG. 10

CDMA COMMUNICATIONS DEVICE AND RELATED METHODS

FIELD OF THE INVENTION

The present invention relates to the field of communication systems, and more particularly, to a code division multiple access (CDMA) communications device for processing CDMA signals, and related methods.

BACKGROUND OF THE INVENTION

Code division multiple access (CDMA) is a channel access method used by various radio communication technologies. CDMA uses a transmission bandwidth that is usually several orders of magnitude larger than the minimum required signal or information bandwidth. The power of each user's signal is spread over a wide bandwidth. This results in low power spectral density, and thereby, the interference to another narrow band signal occupying the same frequency range is reduced. It also makes the presence of the signal less detectable.

A digital signal from each user in a CDMA system is modulated with a pseudo-noise (PN) binary sequence that is unique to that particular user. This modulation causes the spreading over the wide bandwidth. Each PN sequence appears random to an observer but can be reproduced in a deterministic manner by an intended receiver. Any two PN sequences are made substantially orthogonal to each other but some degree of cross correlation still exists. The mutual interference in the same frequency range of multiple users is greatly reduced in a CDMA system. This orthogonality allows multiple access within the same frequency spectrum, and makes CDMA systems less vulnerable to intentional or unintentional interference.

Detection of a CDMA system usually involves cross-correlation with a locally generated version of the PN sequence. A desired user signal is generally detected by cross correlating with the exact same PN sequence that is uniquely assigned to that particular user by the system. Typical CDMA receivers continually demodulate and correlate a received signal to a reference signal. However, this consumes time and processor resources. Moreover, in a blind frequency scanning application, the possible frequency centers for CDMA signals may not be known. Performing correlation filtering at all possible locations is time consuming and processor resource intensive.

A conventional reception timing detection method (chip synchronization) is described in the document titled "Principle of Spread Spectrum Communication" by Andrew J. Viterbi, published on April, 1995, Chapter 3, pp. 39-66. The signal that has been spread with a spreading sequence as a pseudo random code is captured at two phases, initial searching synchronous and tracking synchronous. In the initial searching synchronous method, serial search is executed by sliding the reception timing by ½ chip interval until the correlation power exceeds a given threshold value. In the tracking synchronous method, called as early-late gate or delay lock loop (DLL), the timing is finely adjusted by obtaining the correlation power at the timing ahead the reception delay time by $\Delta t$ and the correlation power at the timing behind the reception delay time by $\Delta t$ so as to make the difference zero.

Another approach is directed to correlation using only selected chip position samples, as disclosed in U.S. Pat. No. 6,996,162. A wireless communications signal is received, wherein the signal includes a first synchronization channel component. A synchronization channel value is correlated to the signal to produce a plurality of correlation samples in response to a correlation between the synchronization channel value and the signal. The plurality of correlation samples is compared to a threshold, and stores selected ones of the plurality of correlation samples a first set of correlation samples that exceed the threshold and are within a first time sample period. Each of the correlation samples in the first set has a corresponding sample time relative to the first time sample period. A second set of correlation samples is combined with the first set of correlation samples.

Yet another approach for detecting CDMA signals is disclosed in U.S. Pat. No. 5,872,776. A multiuser detector for a CDMA system for real-time processing uses interference information of cross correlation from the signals of different users is processed to enhance the signal-to-noise ratio by suppressing the interference noise in a multiple-stage processing. A sampling processor is implemented to obtain at least two sets of data for each user with different integration times. The operation of the detector is dynamically adjusted to the operating condition of the CDMA system in a near real-time manner.

Even in view of the above approaches for processing CDMA signals, there is still a need to improve on such processing so that the less processor resources are needed.

SUMMARY OF THE INVENTION

In view of the foregoing background, it is therefore an object of the present invention to reduce the amount of processor resources needed to process CDMA signals.

This and other objects, features, and advantages in accordance with the present invention are provided by a code division multiple access (CDMA) communications device comprising at least one CDMA receiver configured to isolate a CDMA signal, and a processor coupled to the at least one CDMA receiver to generate a quantized sample representation of the CDMA signal. The processor may perform a hard correlation between the quantized sample representation of the CDMA signal and a quantized representation of a reference to generate a coarse time alignment, and may perform a soft correlation based upon the coarse time alignment between actual values of the CDMA signal and the reference.

The processor may be configured to determine signal timing of the CDMA signal based on the soft correlation. Alternatively, or in addition, the processor may be configured to determine signal strength of the CDMA signal based on the soft correlation.

The CDMA communications device advantageously allows for small observation windows and fast analysis of the frequency spectrum. The hard correlation does not require any complex multiplier resources since quantized values are used. In the soft correlation, the quantized values are replaced with the actual values. Even though actual complex multiplications are performed in the soft correlation, an advantage of the soft correlation is that the complex multiplications are being performed at a particular time alignment, as compared to performing a soft correlation at all possible locations in time. This also helps to conserve processor resources.

The processor may be configured to determine a center frequency of the isolated CDMA signal, and to generate the quantized sample representation of the CDMA signal at its center frequency. The quantized sample representations may be based on binary values, and the hard correlation may be performed using a look-up table. A look-up table may advantageously replace the need for complex multipliers. This allows for quick processing on the potential CDMA signal of interest. Performing straightforward look-ups may save significant processor time over full complex multiplications, as is needed for soft correlation.

The look-up table may include possible combinations of the quantized sample representation of the CDMA signal, possible combinations of the quantized representation of the reference, and corresponding complex multiplications between the possible combinations of the quantized sample representation of the CDMA signal and the possible combinations of the quantized representation of the reference. The quantized sample representation of the CDMA signal and the quantized representation of the reference may each be based on a binary quantization.

The reference may comprise a CDMA pilot signal, and wherein the isolated CDMA signal may comprise a portion of the CDMA pilot signal. The at least one CDMA receiver may lack a priori knowledge of the isolated CDMA signal. The at least one CDMA receiver may be configured to isolate the CDMA signal based on signal-to-noise (SNR) ratios of received signals.

The CDMA communications device may further comprise a memory and a display so that the CDMA communications device is configured as a network analyzer. The memory may store results of the soft correlation and information determined therefrom, and the display may display such information.

Alternatively, the CDMA communications device may further comprise a CDMA transceiver so that the CDMA communications device is configured to operate as a cognitive radio. The processor may operate the CDMA transceiver based on the soft correlation.

Another aspect is directed to a method for processing a CDMA signal using a CDMA communications device as described above. The method may comprise operating the at least one CDMA receiver to isolate the CDMA signal, and operating the processor to generate a quantized sample representation of the CDMA signal. The processor may perform a hard correlation between the quantized sample representation of the CDMA signal and a quantized representation of a reference to generate a coarse time alignment. The processor may perform a soft correlation based upon the coarse time alignment between actual values of the quantized sample representation of the CDMA signal and the reference.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation and double prime notations are used to indicate similar elements in alternative embodiments.

Figure 1:
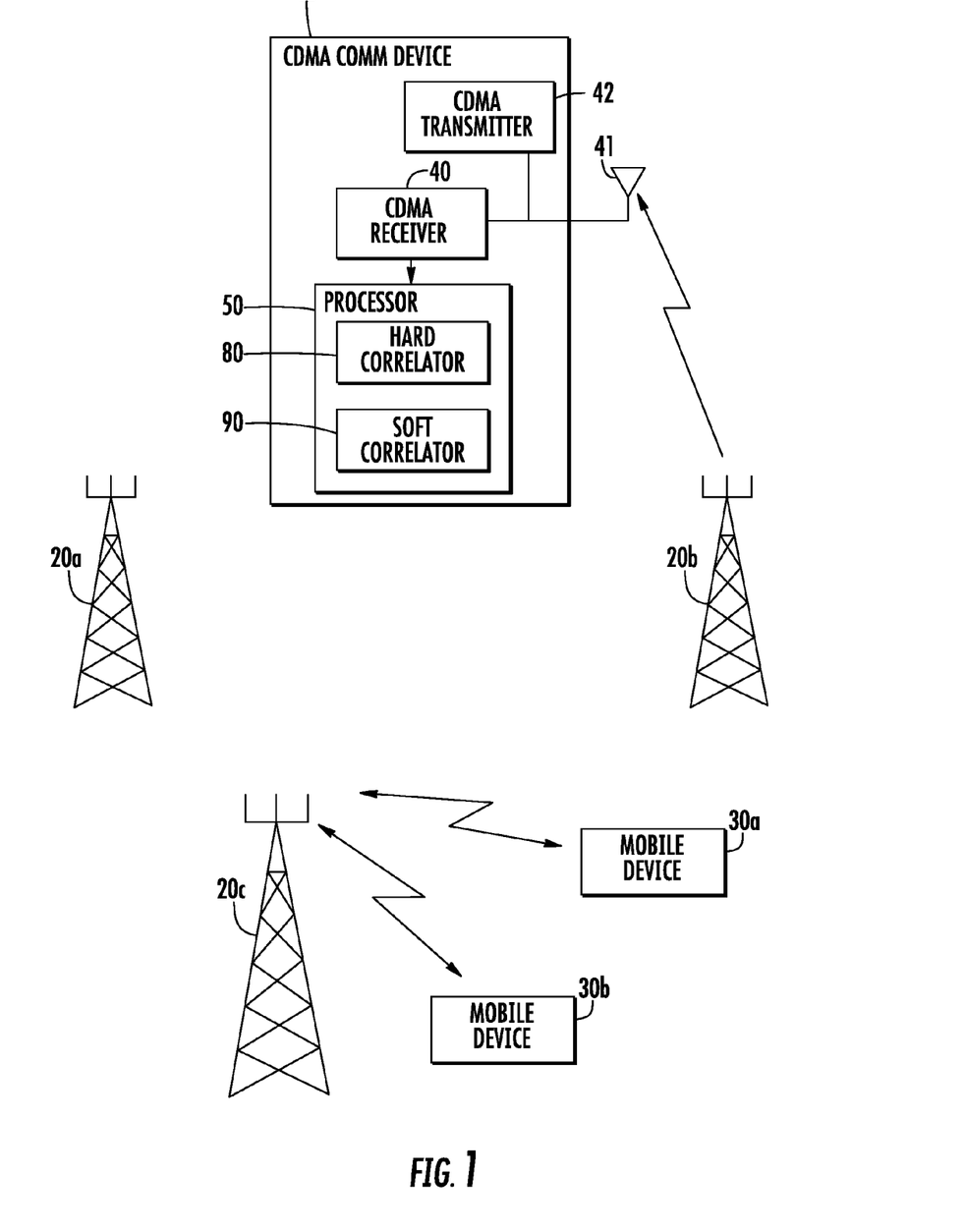
FIG. 1 is a block diagram of a CDMA communications device processing CDMA signals from neighboring cell towers in accordance with the present invention.

Referring initially to FIG. 1, the illustrated code divisional multiple access (CDMA) communications device 10 is operating within range to one or more cell towers 20a-20c for processing CDMA signals. Each cell tower 20a-20c repeatedly transmits a CDMA pilot signal having a pseudo random sequence. The CDMA pilot signal may also be referred to as a reference or reference signal. Each cell tower 20a-20c transmits the same pseudo random sequence, but offset in time with respect to the other cell towers. Mobile devices 30a-30b correlate received CDMA signals with the CDMA pilot signal from a neighboring cell tower 20a-20c to determine a timing offset therebetween. A typical mobile device 30a-30b continually demodulates and correlates a received CDMA signal to the CDMA pilot signal. This consumes time and processor resources. Once the timing offset is adjusted, data can then exchanged with the neighboring cell tower 20a-20c.

For CDMA signals, each mobile device 30a-30b is assigned a particular digital code word that is orthogonal to code words assigned to other mobile devices. Neighboring cell towers 20a-20c can exchange messages with mobile devices 30a-30b using the same frequency but different orthogonal code words to indicate which mobile device the messages are designated for.

The CDMA communications device 10 advantageously allows for small observation windows and fast analysis of the frequency spectrum. As will be explained in greater detail below, this is done with low resource requirements since a hard correlation is initially performed to generate a coarse time alignment between an isolated CDMA signal and a reference (i.e., the CDMA pilot signal). Based on the hard correlation results, then a soft correlation is performed to generate signal timing and/or signal strength of the CDMA signal. The soft correlation thus provides both of these signal attributes. The signal timing provides an accurate signal timing of the CDMA signal, and the signal strength corresponds to the fundamental and multipath components of the CDMA signal.

The CDMA communications device 10 includes at least one CDMA receiver 40 configured to isolate a received CDMA signal, and a processor 50 is coupled to the at least one CDMA receiver to generate a quantized sample representation of the received CDMA signal. An antenna 41 is coupled to the at least one CDMA receiver 40. The processor 50 includes a hard correlation processing chain 80 for performing a hard correlation between the quantized sample representation of the CDMA signal and a quantized sample representation of the reference to generate a coarse time alignment. As noted above, the reference is the known CDMA pilot signal, for example. The processor 50 includes a soft correlation processor chain 90 for performing a soft correlation based upon the coarse time alignment between actual values of the CDMA signal and of the reference to generate to generate signal timing and/or signal strength of the CDMA signal. The CDMA communications device 10 also includes a transmitter 42 coupled to the antenna 41.

Figure 2:
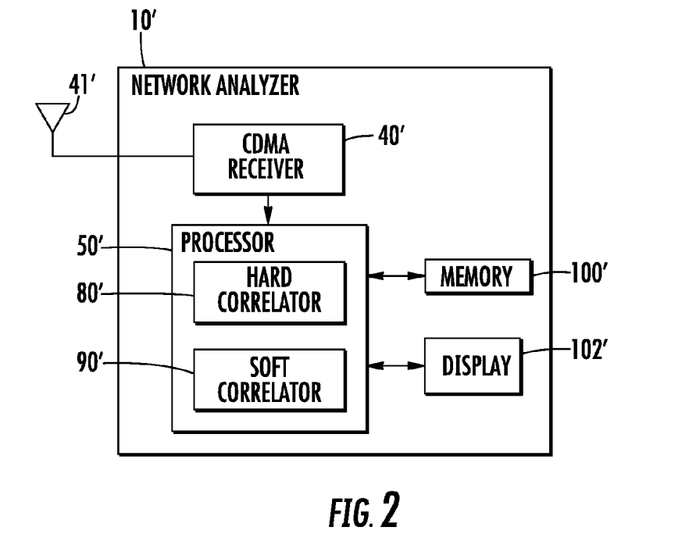
FIG. 2 is a block diagram of the CDMA communications device configured as a network analyzer in accordance with the present invention.

The CDMA communications device may include a memory 100' and a display 102' to function as a network analyzer 10', as illustrated in FIG. 2. The memory 100' is coupled to the processor 50' to store the signal timing and/or signal strength of the CDMA signal. A display 102' is coupled to the processor 50' to provide the signal timing and/or signal strength of the CDMA signal and information associated therewith on the display.

Figure 3:
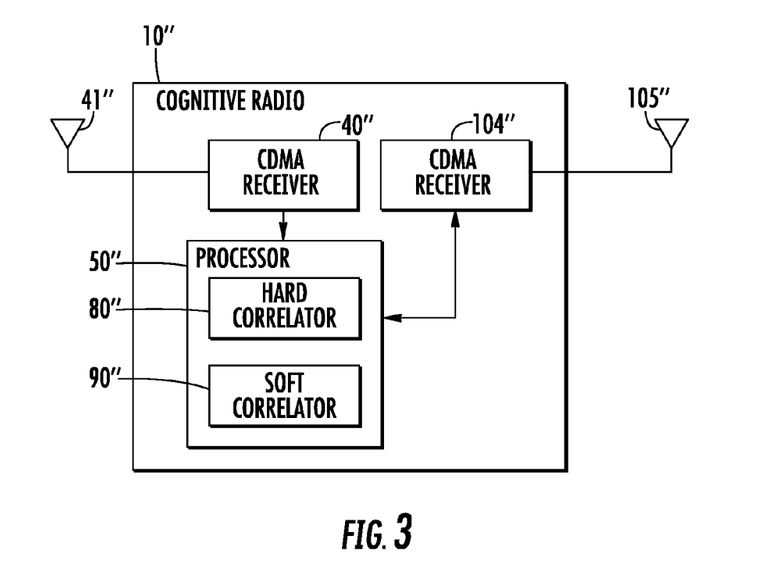
FIG. 3 is a block diagram of the CDMA communications device configured as a cognitive radio in accordance with the present invention.

Alternatively, the CDMA communications device may include a CDMA transceiver 104" to function as a cognitive radio 10", as illustrated in FIG. 3. An antenna 105" is coupled to the CDMA transceiver 104". The processor 50" is configured to operate a CDMA transceiver 104" based on the soft correlation. The at least one CDMA receiver 40" monitors the frequency spectrum in the background so that a different available operating frequency may be selected if necessary. Alternatively, the receive portion of the CDMA transceiver 104" monitors the frequency spectrum so that a separate CDMA receiver 40" is not required.

Other applications for the CDMA communications device 10 that require a brief or short sample of the frequency spectrum with a comparatively long time between checks are applicable, as readily appreciated by those skilled in the art. For example, the CDMA communications device 10 may even be configured to function as a jammer.

Figure 4:
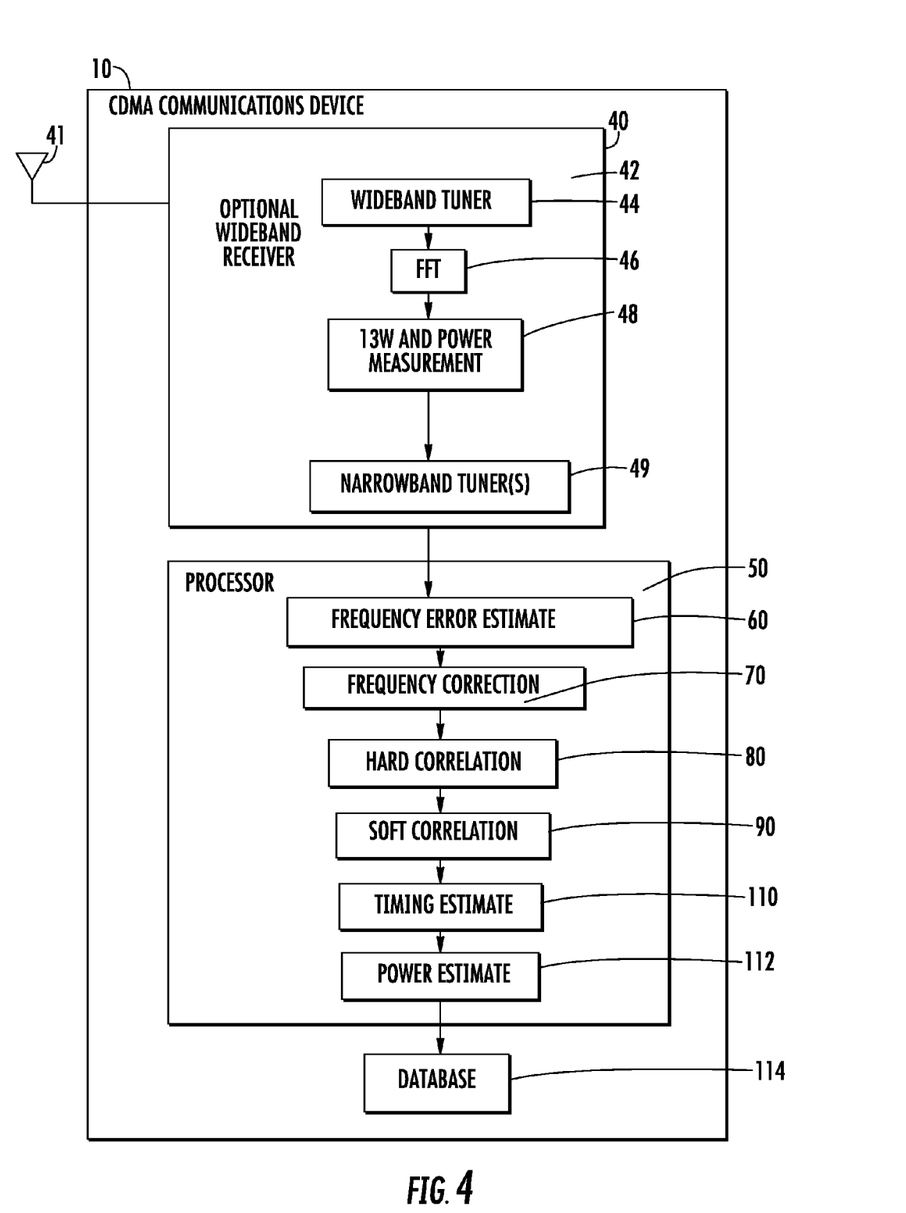
FIG. 4 is a more detailed block diagram of the CDMA communications device illustrated in FIG. 1.

Referring now to FIG. 4, the at least one CDMA receiver 40 may optionally be configured to include a CDMA wideband receiver 42. Large sections of the spectrum can be quickly evaluated with the CDMA wideband receiver 42. This is particularly helpful when there is no a priori knowledge of where the cell towers' 20a-20c operational frequencies are located. A CDMA wideband tuner 44 may operate over a bandwidth of 90 MHz, for example. If necessary, multiple CDMA wideband receivers may be used. For example, one wideband CDMA receiver covers 1.85-1.91 GHz and another wideband CDMA receiver covers 1.93-1.99 GHz. In this case, both sides of a single cellular band are covered. However, in many cases, it is advantageous to cover the receive portion of several different cellular bands, such as 1.93-1.99 GHz, 1.805-1.880 GHz, 925-960 MHz and 869-894 MHz, for example.

The CDMA wideband receiver 42 includes an FFT block 46 to perform a wideband fast Fourier transform (FFT) on the received signals. A magnitude profile of the frequency spectrum is generated based on the FFT. Measurements in a bandwidth and power measurement block 48 are then performed to see where in the frequency spectrum a CDMA signal is located based on its bandwidth and power characteristics.

A CDMA signal having a good signal-to-noise ratio (SNR) can be quickly isolated. For example, the spread signal density for the isolated CDMA signal may be 10 dB above the noise floor. Instead of monitoring every 1.25 MHz channel, the CDMA wideband receiver 42 identifies signals having a good SNR. The portion of the frequency spectrum corresponding to the signal of interest is now identified.

As an alternative to using the CDMA wideband receiver 42, multiple CDMA narrowband receivers 49 may be used. However, if locations of the cell towers' 20a-20c operational frequencies are known, then a single CDMA narrowband receiver 49 may be used to isolate the CDMA signal.

Once a potential CDMA signal of interest has been isolated, the exact frequency is generally not known. Before the hard correlation is performed, the center frequency of the isolated CDMA signal needs to be determined. A frequency error estimation block 60 is used to determine the frequency offset. The frequency offset in the potential CDMA signal of interest is then corrected in a frequency correction block 70.

For CDMA2000, center frequencies can occur at a 20, 25, 30 or 50 kHz spacing. A CDMA channel is 1.25 MHz, which makes it difficult to blindly determine the center frequency from a short time observation FFT.

Another reason the exact frequency is not known is that there is typically a frequency offset between the cell towers 20a-20c and the at least one CDMA receiver 40 due to oscillator accuracies. A 1 PPM oscillator difference at 1.9 GHz yields a 1.9 kHz offset, for example.

To determine the frequency difference, a phase locked loop can be used. For very short observation windows, this may not be sufficient. An alternative approach for CDMA signals with sufficient SNR is to take the QPSK signal to the fourth power. This will remove the modulation and provide the offset center frequency. Other techniques to determine the frequency difference are applicable as readily understood by those skilled in the art.

Figure 5:
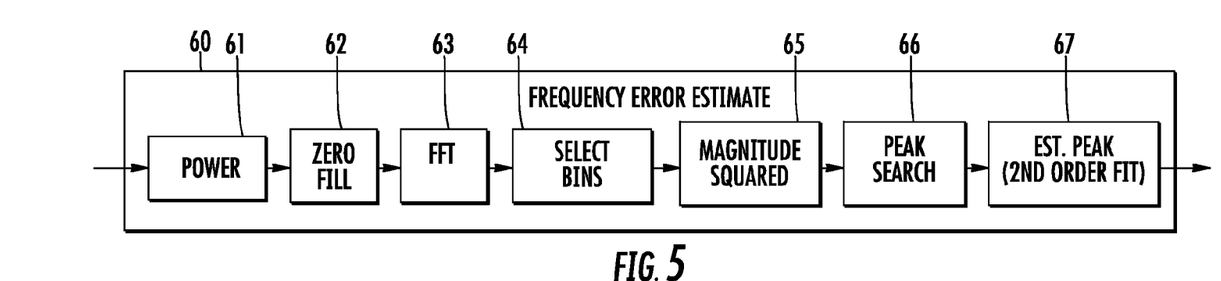
FIG. 5 is a block diagram of a frequency error offset processing chain for the CDMA communications device illustrated in FIG. 4.

An example frequency error estimation processing chain 60 for determining the offset from the center frequency of the potential CDMA signal of interest will be discussed with reference to FIG. 5. The potential CDMA signal of interest is provided to a power block 61. Since the potential CDMA signal of interest includes the CDMA pilot signal, which is a QPSK signal having 4 possible states, the power block 61 takes the CDMA signal to the fourth power to remove any data therefrom. This generates a tone signal.

The tone signal is then provided to a zero fill block 62. The zero fill block 62 adds zeros to the tone signal prior to the FFT block 63. The FFT block 63 then generates an FFT of the tone signal. With the FFT, a limited number of bins are selected in the select bin block 64 since the entire FFT does not need to be searched. The magnitude squared of the FFT in the selected bins is performed in the magnitude squared block 65. A peak search is performed in the peak search block 66 to provide a selected peak. An estimated peak block 67 performs an interpolation on a number of samples of the selected peak based on a second order fit. The more peak samples there are the more accurate the center frequency offset is determined.

Figure 6:
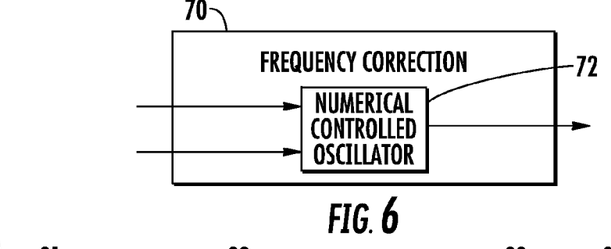
FIG. 6 is a block diagram of a frequency correction block for the CDMA communications device illustrated in FIG. 4.

The offset signal as estimated by the frequency error estimation processing chain 60 is provided as an input to the frequency correction block 70, as illustrated in FIG. 6. The frequency correction block 70 includes a numerically controlled oscillator (NCO) 72. The offset signal is a complex signal. The potential CDMA signal of interest is also provided as input to the NCO 72. The NCO 72 multiples the potential CDMA signal of interest with the offset signal to generate a shifted or corrected potential CDMA signal of interest.

Once the frequency offset has been corrected in the potential CDMA signal of interest, then a hard correlation is performed. The hard correlation is to find the relative time offset for the potential CDMA signal of interest, its multipath components or other CDMA signals with a different PN start time on the same frequency. For discussion purposes, attention will be focused on the potential CDMA signal of interest. The hard correlation allows for quick processing on the potential CDMA signal of interest, and does not require any multiplier resources since quantized values are used. Instead of multiplying actual complex values, a straightforward look-up table may be used to determine the complex multiplications.

Figure 7:
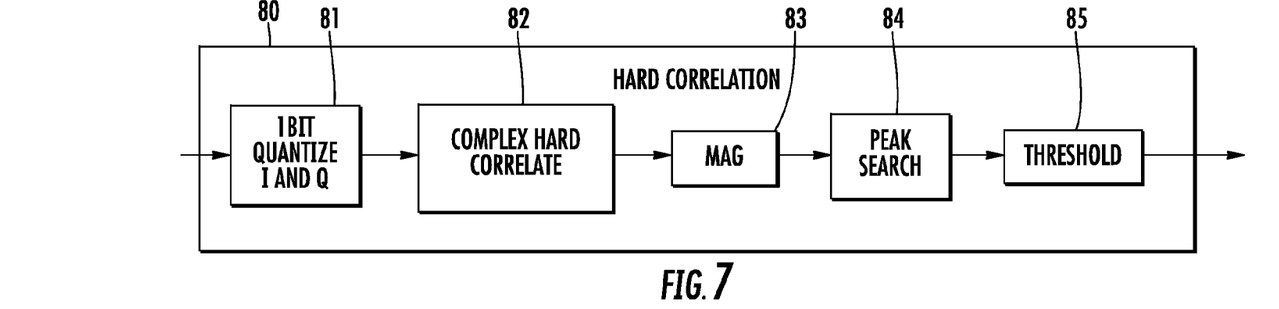
FIG. 7 is a block diagram of a hard correlation processing chain for the CDMA communications device illustrated in FIG. 4.

The hard correlation processing chain 80 for performing the hard correlation between the quantized sample representation of the CDMA signal and a quantized representation of the reference to generate a coarse time alignment is provided in FIG. 7. A quantized sample representation of the corrected potential CDMA signal of interest is generated in the quantization block 81. Quantization is performed so that there is 1 bit per sample, with means 1 bit for the I channel and 1 bit for the Q channel. There will be a 1 if the sample is greater than 0, and a 0 if the sample is less than 0. This is done for every bit.

The quantized sample representation of the corrected potential CDMA signal of interest is provided to the complex hard correlation block 82. The complex hard correlation block 83 has a stored representation of the CDMA pilot signal, which has also been quantized to 1 bit for the I channel and one bit for the Q channel.

The CDMA pilot signal transmitted by a cell tower 20a-20c repeats itself every 26.67 ms. The CDMA pilot signal is represented by reference 21 in FIG. 8 as two 32,768 bit words (complex), one for the I channel and one for the Q channel. Since the CDMA pilot signal is known, it can easily be quantized and stored. In such a quantization, an actual value in the CDMA pilot signal 21 less than 1 would be mapped to a 0 and an actual value greater than 1 would be mapped to a 1.

Figure 8:
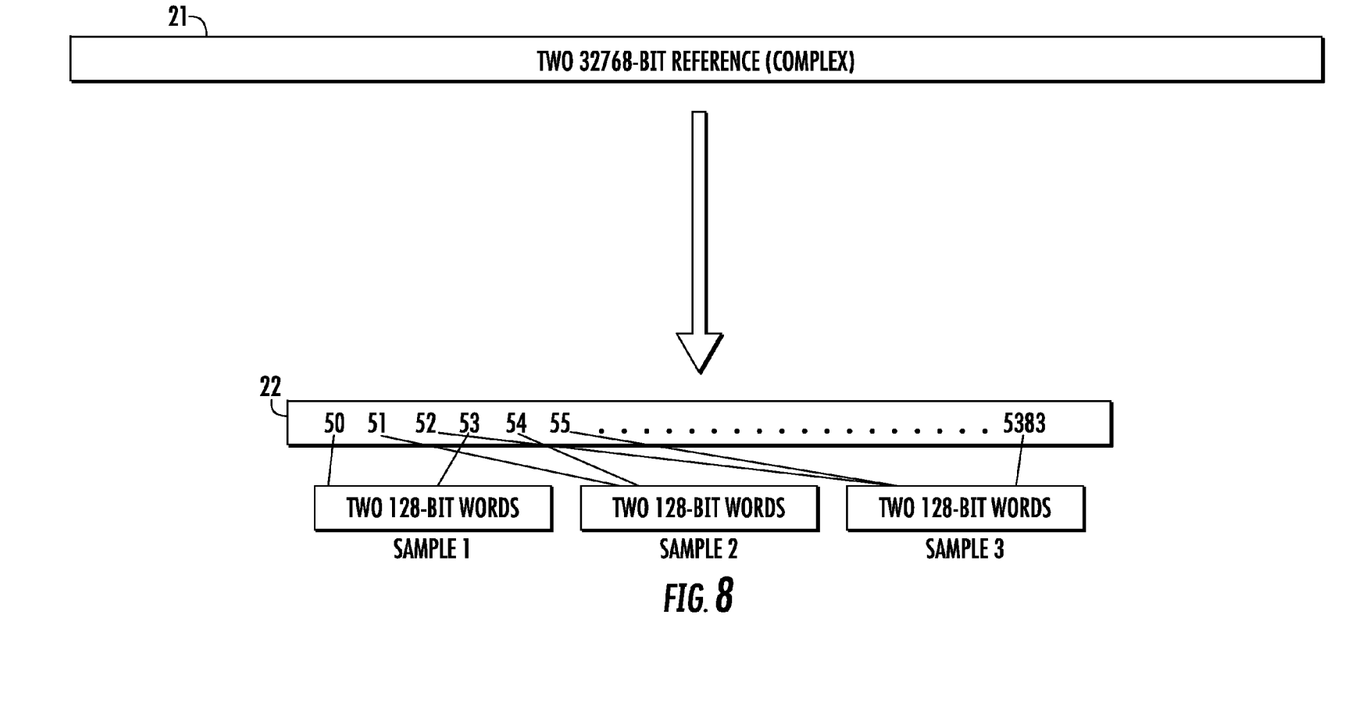
FIG. 8 is a block diagram of a quantized representation of the reference, and a quantized sample representation of the CDMA signal in accordance with the present invention.

The corrected potential CDMA signal of interest is a subset of the CDMA pilot signal, and is quantized in both the I and Q channel. In such a quantization, an actual value in the corrected potential CDMA signal of interest less than 1 would also be mapped to a 0 and an actual value greater than 1 would also be mapped to a 1. Essentially, the quantization is a sample representation of the corrected potential CDMA signal of interest.

As an example, the at least one CDMA receiver 40 has a relatively short dwell time of 104.2 µs. With a dwell time of 104.2 µs and a chip rate of 1.2288 MHz for the CDMA pilot signal, there will be 3 samples per chip. The 104.2 µs samples are represented by reference 22. This includes 3 samples for the I channel and 3 samples for the Q channel. Since the sampling is above the minimum Nyquest rate, there is more than 1 sample per chip.

Chip and bit are interchangeable, with a chip referring to a section of the PN sequence of the spreading code. For the 104.2 µs sample 22, there are a total of 384 bits. For sample 1, this includes bits S0, S3, S6 . . . S381. For sample 2, this includes bits S1, S4, S7 . . . S382. For sample 3, this includes bits S2, S5, S8 . . . S383.

Not all of the samples may be good. For example, samples 1 and 3 may be close to an edge at a transition of a bit. However, sample 2 may be ideally positioned on top of the bit. Samples 1 and 3 are not useful for achieving a good alignment since their values will not correlate well since their samples are around 0. Sample 2 is a good arbitrary representation. This is why multiple samples should be taken.

To perform a hard correlation, a look-up table is used, as provided in TABLE 1, for example. The first column INPUT in the look-up table corresponds to the quantized sample of the potential CDMA signal of interest. The second column REFERENCE corresponds to the quantized representation of the reference, i.e., the CDMA pilot signal. The third column COMPLEX MULTIPLY corresponds to the normalized complex multiplication results for the corresponding entries in the INPUT and REFERENCE columns.

TABLE 1

| INPUT | REFERENCE | COMPLEX MULTIPLY |
|---|---|---|
| (0, 0) | (0, 0) | (0, 1) |
| (0, 0) | (0, 1) | (1, 0) |
| (0, 0) | (1, 0) | (−1, 0) |
| (0, 0) | (1, 1) | (0, 1) |
| (0, 1) | (0, 0) | (1, 0) |
| (0, 1) | (0, 1) | (0, −1) |
| (0, 1) | (1, 0) | (0, 1) |
| (0, 1) | (1, 1) | (−1, 0) |
| (1, 0) | (0, 0) | (−1, 0) |
| (1, 0) | (0, 1) | (0, 1) |
| (1, 0) | (1, 0) | (0, −1) |
| (1, 0) | (1, 1) | (1, 0) |
| (1, 1) | (0, 0) | (0, 1) |
| (1, 1) | (0, 1) | (−1, 0) |
| (1, 1) | (1, 0) | (1, 0) |
| (1, 1) | (1, 1) | (0, 1) |

When performing a hard correlation, a determination is being made to see how the sample and the CDMA pilot signal are related. For sample 1, each of the 128 bits INPUT is multiplied by a first bit in the REFERENCE. Sample 1 is cross correlated with the reference. The cross correlation may be represented by the following equation, where * denotes the complex conjugate and N is the number of samples in sample 1:

$$\text{correlation } [n] = \Sigma_{m=0}^{N} \text{reference}*[n+m] \text{sample } 1[m]$$

INPUT is referring to the m sample of sample 1 and REFERENCE is referring to the [n+m] sample of reference. Instead of actually multiplying, the look-up table is used to determine what the multiplication would be for the corresponding INPUT and REFERENCE values. The magnitude is taken in the magnitude block 83. This is the correlation value for the given relative time sample. The magnitude is compared with the peak in the peak search block 84. The corresponding peak value is saved and indexed in the reference REFERENCE.

This process will be repeated again for the second bit in the reference REFERENCE until all 32,768 bits have been correlated. Once the 128 bits in sample 1 have been hard correlated with the 32,768 bits in the reference REFERENCE, then the process repeats for each of the other two samples 2 and 3.

The peak values are compared to a threshold in the threshold block 85. Once a peak time offset is found and it is above the threshold, then this advantageously provides a coarse time alignment between the quantized potential CDMA signal of interest and the quantized representation of the CDMA pilot signal.

The hard correlation may be implemented with low resource requirements since the look-up table can be implemented without the need for complex multipliers. This allows for quick processing on the potential CDMA signal of interest. Performing straightforward look-ups saves significant processor time over full complex multiplications, as is needed for soft correlation. Low memory requirements are also achieved since single bits are stored for the reference.

Figure 9:
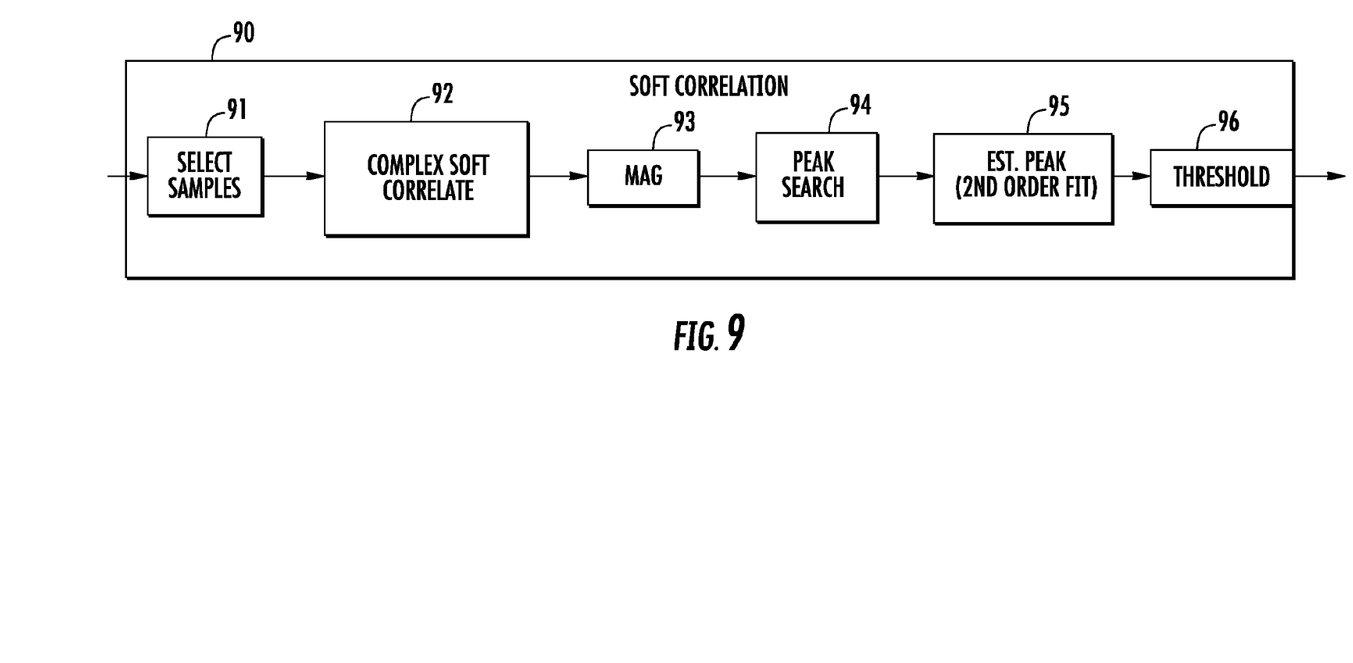
FIG. 9 is a block diagram of a soft correlation processing chain for the CDMA communications device illustrated in FIG. 4.

The soft correlation processor chain 90 for performing a soft correlation based upon the coarse time alignment between actual values of the CDMA signal and of the reference to generate to generate signal timing and/or signal strength of the CDMA signal is provided in FIG. 9. Between the three samples 1, 2 and 3, sample 2, for example, has peak values above the threshold. This particular sample as determined by the select samples block 91 is then provided to the complex soft correlator block 92.

In the soft correlator block 92, the quantized values are replaced with the actual values. Here, actual complex multiplications are performed. An advantage here is that the complex multiplications are being performed at a particular time alignment, as compared to performing a soft correlation at all possible locations in time. This also helps to conserve processor resources. The magnitude of the soft correlation values are taken in the magnitude block 93. The magnitude is compared with the peak in the peak search block 94 to provide a selected peak. An estimated peak block 95 performs an interpolation on a number of samples of the selected peak based on a second order fit or other estimator. The more peak samples there are the more accurate the center frequency offset is determined. The resulting values are then compared to a threshold in a threshold block 96. The corresponding peak value is saved and indexed in the reference REFERENCE.

The processor 50 also includes a timing estimate block 110 and a power estimate block 112 to perform power and timing estimates for the CDMA signal. These values are then stored in a database 114 for review.

Figure 10:
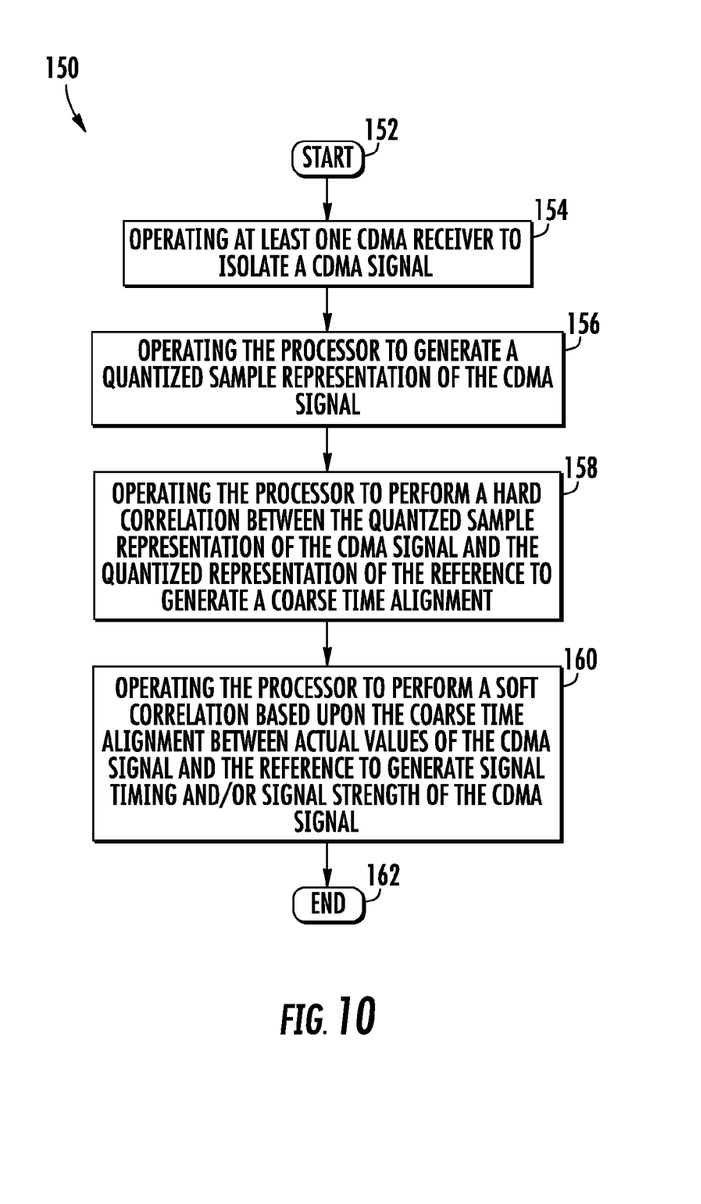
FIG. 10 is a block diagram illustrating a method for processing CDMA signals in accordance with the present invention.

Another aspect is directed to a method for processing a CDMA signal using a CDMA communications device 10 as described above. Referring to the flowchart 150 in FIG. 10, from the start (Block 152), the method comprises operating the at least one CDMA receiver 40 to isolate the CDMA signal at Block 154. The processor 50 is operated at Block 156 to generate a quantized sample representation of the CDMA signal. At Block 158, the processor 50 is operated to perform a hard correlation between the quantized sample representation of the CDMA signal and a quantized representation of the reference to generate a coarse time alignment. Based upon the coarse time alignment, the processor 50 is operated to perform a soft correlation between actual values of the quantized sample representation of the CDMA signal and the reference to generate to generate signal timing and/or signal strength of the CDMA signal. The method ends at Block 162.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A code division multiple access (CDMA) communications device comprising:
at least one CDMA receiver configured to isolate a CDMA signal; and
a processor coupled to said at least one CDMA receiver and configured to
generate a quantized sample representation of the CDMA signal,
perform a hard correlation between the quantized sample representation of the CDMA signal and a quantized representation of a reference to generate a coarse time alignment, with the hard correlation being performed using a look-up table including possible combinations of the quantized sample representation of the CDMA signal, possible combinations of the quantized representation of the reference, and corresponding complex multiplications between the possible combinations of the quantized sample representation of the CDMA signal and the possible combinations of the quantized representation of the reference, and
perform a soft correlation based upon the coarse time alignment between actual values of the CDMA signal and the reference.

2. The CDMA communications device according to claim 1 wherein said processor is configured to determine signal timing of the CDMA signal based on the soft correlation.

3. The CDMA communications device according to claim 1 wherein said processor is configured to determine signal strength of the CDMA signal based on the soft correlation.

4. The CDMA communications device according to claim 1 wherein said processor is configured to determine a center frequency of the isolated CDMA signal, and to generate the quantized sample representation of the CDMA signal at its center frequency.

5. The CDMA communications device according to claim 1 wherein the quantized sample representation of the CDMA signal and the quantized representation of the reference are based on binary values.

6. The CDMA communications device according to claim 1 wherein the reference comprises a CDMA pilot signal, and wherein the isolated CDMA signal comprises a portion of the CDMA pilot signal.

7. The CDMA communications device according to claim 1 wherein said at least one CDMA receiver lacks a priori knowledge of the isolated CDMA signal.

8. The CDMA communications device according to claim 1 wherein said at least one CDMA receiver is configured to isolate the CDMA signal based on signal-to-noise (SNR) ratios of received signals.

9. The CDMA communications device according to claim 1 further comprising a memory coupled to said processor; and wherein said processor is configured to store results of the soft correlation in said memory.

10. The CDMA communications device according to claim 9, further comprising a display coupled to said processor; and wherein said processor causes the results of the soft correlation to be provided on said display.

11. The CDMA communications device according to claim 1 further comprising a CDMA transceiver; and wherein said processor is configured to operate said CDMA transceiver based on the soft correlation.

12. A code division multiple access (CDMA) communications device comprising:
at least one CDMA receiver configured to isolate a CDMA signal; and
a processor coupled to said at least one CDMA receiver and configured to
determine a center frequency of the isolated CDMA signal, generate a quantized sample representation of the CDMA signal at its center frequency, perform a hard correlation between the quantized sample representation of the CDMA signal and a quantized representation of a reference using a look-up table to generate a coarse time alignment, with the look-up table including possible combinations of the quantized sample representation of the CDMA signal, possible combinations of the quantized representation of the reference, and corresponding complex multiplications between the possible combinations of the quantized sample representation of the CDMA signal and the possible combinations of the quantized representation of the reference, and perform a soft correlation based upon the coarse time alignment between actual values of the CDMA signal and the reference.

13. The CDMA communications device according to claim 12 wherein said processor is configured to determine signal timing of the CDMA signal based on the soft correlation.

14. The CDMA communications device according to claim 12 wherein said processor is configured to determine signal strength of the CDMA signal based on the soft correlation.

15. The CDMA communications device according to claim 12 wherein the quantized sample representation of the CDMA signal and the quantized representation of the reference are each based on a binary quantization.

16. The CDMA communications device according to claim 12 wherein the reference comprises a CDMA pilot signal, and wherein the isolated CDMA signal comprises a portion of the CDMA pilot signal.

17. The CDMA communications device according to claim 12 wherein said at least one CDMA receiver lacks a priori knowledge of the isolated CDMA signal.

18. The CDMA communications device according to claim 12 wherein said at least one CDMA receiver is configured to isolate the CDMA signal based on signal-to-noise (SNR) ratios of received signals.

19. The CDMA communications device according to claim 12 further comprising a CDMA transceiver; and wherein said processor is configured to operate said CDMA transceiver based on the soft correlation.

20. A method for processing a code division multiple access (CDMA) signal using a CDMA communications device comprising at least one CDMA receiver and a processor coupled thereto, the method comprising:

operating the at least one CDMA receiver to isolate the CDMA signal; and operating the processor to generate a quantized sample representation of the CDMA signal, perform a hard correlation between the quantized sample representation of the CDMA signal and a quantized representation of a reference to generate a coarse time alignment, with the hard correlation being performed using a look-up table including possible combinations of the quantized sample representation of the CDMA signal, possible combinations of the quantized representation of the reference, and corresponding complex multiplications between the possible combinations of the quantized sample representation of the CDMA signal and the possible combinations of the quantized representation of the reference, and perform a soft correlation based upon the coarse time alignment between actual values of the quantized sample representation of the CDMA signal and the reference.

21. The method according to claim 20 wherein operating the processor further comprises determining signal timing of the CDMA signal based on the soft correlation.

22. The method according to claim 20 wherein operating the processor further comprises determining signal strength of the CDMA signal based on the soft correlation.

23. The method according to claim 20 wherein operating the processor further comprises determining a center frequency of the isolated CDMA signal, and wherein the quantized sample representation of the CDMA signal is generated at its center frequency.

24. The method according to claim 20 wherein the quantized sample representation of the CDMA signal and the quantized representation of the reference are based on binary values.

25. The method according to claim 20 wherein the reference comprises a CDMA pilot signal, and wherein the isolated CDMA signal comprises a portion of the CDMA pilot signal.

26. The method according to claim 20 wherein the at least one CDMA receiver is configured to isolate the CDMA signal based on signal-to-noise (SNR) ratios of received signals.

* * * * *